United States Patent
Stolbikov et al.

(10) Patent No.: US 11,758,393 B1
(45) Date of Patent: Sep. 12, 2023

(54) VPN AUTHENTICATION WITH FORWARD SECRECY

(71) Applicant: Lenovo (Singapore) Pte. Ltd., New Tech Park (SG)

(72) Inventors: Igor Stolbikov, Apex, NC (US); John M. Petersen, Wake Forest, NC (US); Gary D. Cudak, Wake Forest, NC (US); Nathan Peterson, Oxford, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/709,789

(22) Filed: Mar. 31, 2022

(51) Int. Cl.
*H04L 9/40* (2022.01)
*H04W 12/041* (2021.01)
*H04L 9/32* (2006.01)
*H04L 9/30* (2006.01)
*H04L 9/08* (2006.01)

(52) U.S. Cl.
CPC .......... *H04W 12/041* (2021.01); *H04L 9/088* (2013.01); *H04L 9/0841* (2013.01); *H04L 9/3066* (2013.01); *H04L 9/3236* (2013.01); *H04L 63/0272* (2013.01)

(58) Field of Classification Search
CPC ..... H04L 9/3236; H04L 9/3066; H04L 9/038; H04L 9/0841; H04L 63/0272
See application file for complete search history.

(56) References Cited

U.S. PATENT DOCUMENTS

| | | | | |
|---|---|---|---|---|
| 10,554,636 | B2 * | 2/2020 | Bhattacharyya | .... H04L 63/0869 |
| 10,903,991 | B1 * | 1/2021 | Craige | .................. H04L 9/3252 |
| 11,050,723 | B1 * | 6/2021 | Mahdavi | ............... H04L 9/0844 |
| 11,265,300 | B1 * | 3/2022 | Mahdavi | ............. G06F 21/6254 |
| 11,438,176 | B2 * | 9/2022 | Nix | ........................... H04L 9/14 |
| 2011/0131406 | A1 * | 6/2011 | Jones | .................... H04L 63/061 |
| | | | | 713/150 |

(Continued)

OTHER PUBLICATIONS

M. Marlinspike, "The X3DH Key Agreement Protocol", Signal, https://signal.org/docs/specifications/x3dh/, Nov. 4, 2016 pp. 1-11.

*Primary Examiner* — Samson B Lemma
(74) *Attorney, Agent, or Firm* — Kunzler Bean & Adamson

(57) ABSTRACT

Various disclosed embodiments include illustrative apparatuses, methods, and program products. In an illustrative embodiment, an apparatus includes a processor, a network interface, and a memory that stores code executable by the processor. The code receives signed keys from a computing device over a network via the network interface. The signed keys include a key signed by a mobile device associated with the computing device and the signed keys were generated responsive to a first key agreement protocol configured to provide one of forward secrecy protection and time-based expiration. The code authenticates the received signed keys responsive to prior knowledge of public keys associated with at least one of the computing device and the mobile device according to a second key agreement protocol configured to provide one of forward secrecy protection and time-based expiration and code that initiates a communication between the processor and the device responsive to the received signed keys being authenticated.

20 Claims, 3 Drawing Sheets

(56) References Cited

U.S. PATENT DOCUMENTS

| | | | | |
|---|---|---|---|---|
| 2016/0065370 A1* | 3/2016 | Le Saint | ............... | H04L 9/0861 |
| | | | | 713/155 |
| 2019/0097982 A1* | 3/2019 | Bhattacharyya | .......... | H04L 9/14 |
| 2019/0305953 A1* | 10/2019 | Le Saint | ............... | H04L 63/061 |
| 2020/0204527 A1* | 6/2020 | Vass | ..................... | G06Q 10/107 |
| 2022/0353252 A1* | 11/2022 | Le Saint | ............. | H04L 63/0428 |

* cited by examiner

VPN AUTHENTICATION WITH FORWARD SECRECY

FIELD

The subject matter disclosed herein relates to connecting an electronic device to a virtual private network (VPN).

BACKGROUND

Enterprises typically will require authentication beyond a password to connect to their networks via VPN—this can include One Time Passwords (OTP). However, OTP apps are not integrated with the tools used to establish VPN connections. Existing solutions are based on the user password authentication, use of time-based OTP (TOTP) or X509 certificates. This generates a set of manual steps which must be performed by the user every time they want to get a VPN set up, typically at the beginning of each workday, starting with waiting for OTP refresh or typing in a PIN number to start the app. Further, this problem affects most remote workers, causing the issue to scale from a minute per worker per day to many hours per thousand workers, per day.

BRIEF SUMMARY

Various disclosed embodiments include illustrative apparatuses, methods, and program products.

In an illustrative embodiment, an apparatus includes a processor, a network interface, and a memory that stores code executable by the processor. The code includes code that receives signed keys from a computing device over a network via the network interface. The signed keys include a key signed by a mobile device associated with the computing device and the signed keys were generated responsive to a first key agreement protocol configured to provide one of forward secrecy protection, post-compromise protection, and reply attack protection in the form of time-based expiration. The code also includes code that authenticates the received signed keys responsive to prior knowledge of public keys associated with at least one of the computing device and the mobile device according to a second key agreement protocol configured to provide one of forward secrecy protection, post-compromise protection, and reply attack protection in the form of time-based expiration and code that initiates a communication between the processor and the device responsive to the received signed keys being authenticated.

In another illustrative embodiment, a method includes, at a server apparatus, receiving signed keys from a computing device over a network via the network interface. The signed keys include a key signed by a mobile device associated with the computing device and the signed keys were generated responsive to a first key agreement protocol configured to provide one of forward secrecy protection, post-compromise protection, and reply attack protection in the form of time-based expiration. The method also includes authenticating the received signed keys responsive to prior knowledge of public keys associated with at least one of the computing device and the mobile device according to a second key agreement protocol configured to provide one of forward secrecy protection, post-compromise protection, and reply attack protection in the form of time-based expiration and initiating a communication between the processor and the device responsive to the received signed keys being authenticated.

In still another illustrative embodiment, a program product comprising a computer readable storage medium that stores code executable by a processor. The executable code includes code to perform receiving signed keys from a computing device over a network via the network interface. The signed keys include a key signed by a mobile device associated with the computing device and the signed keys were generated responsive to a first key agreement protocol configured to provide one of forward secrecy protection, post-compromise protection, and reply attack protection in the form of time-based expiration. The code also includes code to perform authenticating the received signed keys responsive to prior knowledge of public keys associated with at least one of the computing device and the mobile device according to a second key agreement protocol configured to provide one of forward secrecy protection, post-compromise protection, and reply attack protection in the form of time-based expiration and initiating a communication between the processor and the device responsive to the received signed keys being authenticated.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
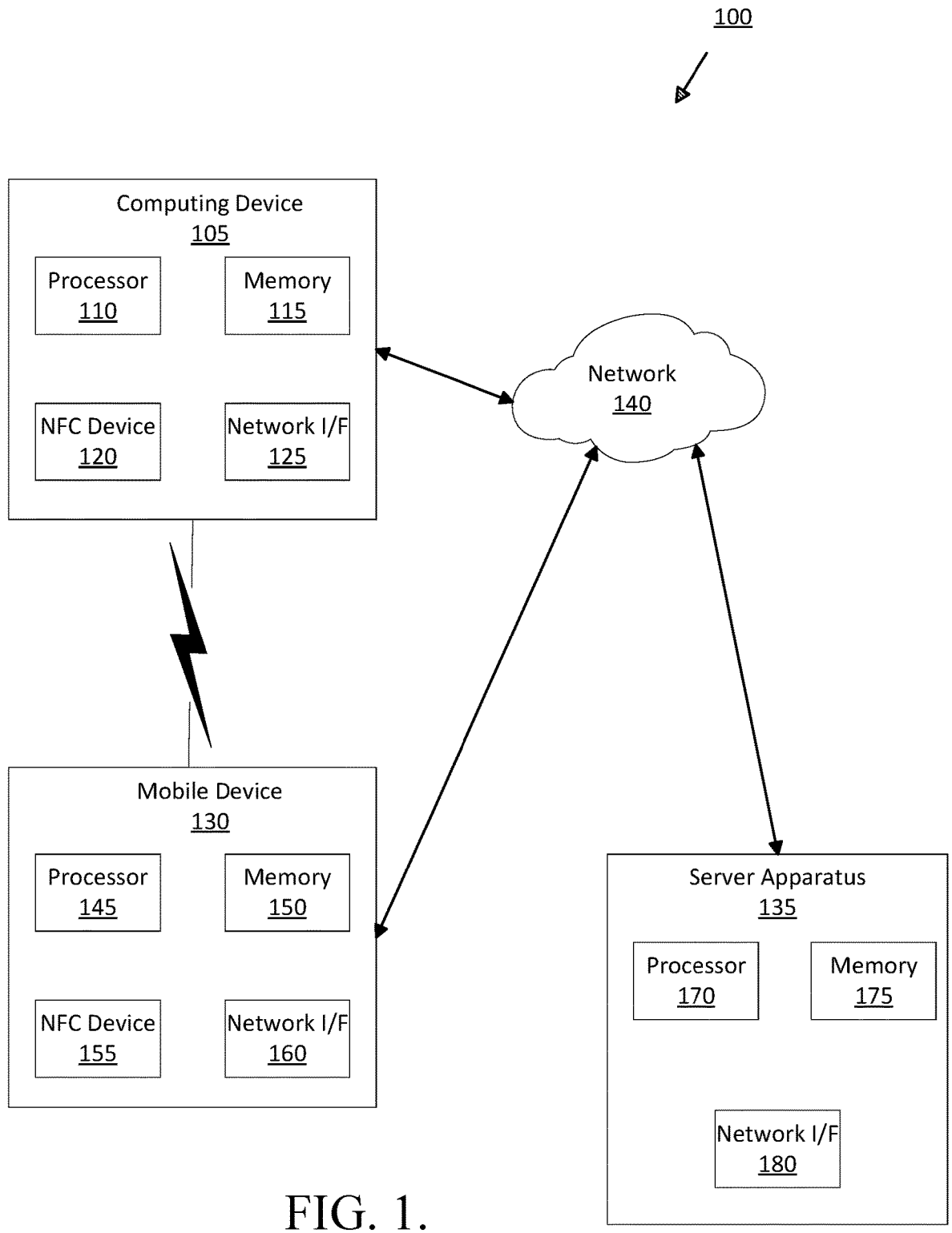
FIG. 1 is a schematic block diagram illustrating one embodiment of a system for authenticating access for a computing device.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatus, methods, and program products that can provide authenticated access to a network, such as VPN, a website, or the like with use of key agreement protocols configured to provide authenticity of communications, integrity, forward secrecy protection, post-compromise protection, and reply attack protection in form of time-based expiration using public/private key pairs from requesting computing devices, associated mobile device, and a server apparatus are disclosed herein. In one embodiment, the server apparatus includes a processor and a memory configured to store code executable by the processor. The code, when executed by the processor, causes the processor to implement a three way forward secrecy protocol configured to establish digital trust relationships between the processor and computing devices attempting to join a network.

A method is provided for authenticated access to a network, such as a VPN, with use of key agreement protocols configured to provide authenticity of communications, integrity, forward secrecy protection, post-compromise protection, and reply attack protection in form of time-based expiration using public/private key pairs from a requesting computing device, an associated mobile device, and a server apparatus.

A computer program product or code stored on the computer program product provides for authenticating access to a network with use of key agreement protocols configured to provide authenticity of communications, integrity, forward secrecy protection, post-compromise protection, and reply attack protection in form of time-based expiration. The code is executable by a processor of a server apparatus to cause the processor to establish digital trust relationship between the server apparatus and the computing device attempting to join the network, such as a VPN.

Forward secrecy: compromise of a key at an endpoint does not cause all previous communications to be immediately decryptable.

Post-compromise security: compromise of a key at an endpoint does not cause all future messages to be revealed, i.e. there is a way to recover security properties even after a compromise.

In one embodiment, the key agreement protocols offer 3 parties mutual authentication (mobile device, computing device (laptop), server) offering high level of security in the protocol.

Turning now to the drawings, FIG. 1 is a schematic block diagram illustrating one embodiment of a network 100 (or system 100) for authenticating a computing device when accessing a network, such as a VPN. The network 100 may include any suitable network and/or type of network that is known or developed in the future. Examples of a network 100 include, but are not limited to, a mesh network, a communication network, a local network, a WIFI network (e.g., WIFI 6, etc.), and a thread network, etc., among other networks and/or types of networks that are possible and contemplated herein.

In some embodiments, the system 100 may include a computing device 105, a mobile device 130, and a server apparatus 135. The computing device 105 includes a processor 110, a memory device 115, a near-field communication device 120, and a network interface (i/f) device 125. The mobile device 130 includes a processor 145, a memory device 150, a near-field communication device 155, and a network interface (i/f) device 130. The server apparatus 135 includes a processor 170, a memory device 175, and a network interface (i/f) device 180. The computing device 105 and the mobile device 130 may be any computing device capable of storing and executing code stored in the memory devices (computer-readable storage medium) 115 and 150, respectively. The computing device 105 and the mobile device 130 may include, but not limited to, a mobile phone, a smart phone, a tablet computer, a laptop computer, a desktop computer, a personal computer, a portable gaming console, a server, a mainframe, a networked storage device, or the like. In some embodiments, the computing device 105 may be connected to another device, such the mobile device 130 via the NFC device 120, and/or the server apparatus 135, via a data network 140. The data network 140 may be a public or private data network, such as, without limitation, the Internet, a local area network, a wide-area network, a Wi-Fi network, a mobile telephone network, or combinations thereof.

In some embodiments, the processors 110, 145, and 170, in one embodiment, may include any known controller capable of executing computer-readable instructions and/or capable of performing logical operations. For example, the processors 110, 145, and 170 may be a microcontroller, a microprocessor, a central processing unit (CPU), a graphics processing unit (GPU), an auxiliary processing unit, a field programmable gate array (FPGA), or similar programmable controller. In some embodiments, the processors 110, 145, and 170 executes instructions stored in the respective memory device 115, 150, and 175 to perform the methods and routines described herein. The processors 110, 145, and 170 are communicatively coupled to their respective memory devices 115, 150, and 175, the NFC devices 120 and 155, and the network i/f devices 125, 160, and 180.

In some embodiments, the memory devices 115, 155, and 175 may include volatile computer storage media. For example, the memory 115 may include a random access memory (RAM), including dynamic RAM (DRAM), synchronous dynamic RAM (SDRAM), and/or static RAM (SRAM). In some embodiments, the memory devices 115, 155, and 175 may include non-volatile computer storage media. For example, the memory devices 115, 155, and 175 may include a hard disk drive, a flash memory device, a read-only memory (ROM), a programmable ROM (PROM), a BIOS chip, or any other suitable non-volatile computer storage device. In some embodiments, the memory 115 includes both volatile and non-volatile computer storage media.

In some embodiments, the memory devices 115, 155, and 175 may store code or protocols for performing key pair encryption in accordance with forward secrecy protection and/or time-based expiration. In some embodiments, the memory devices 115, 155, and 175 may also store program code and related data, such as an operating system or other controller algorithms operating on the computing device 105, the mobile device 130, and the server apparatus 135, respectively.

In some embodiments, the system 100 uses Diffie-Hellman (DH) key agreement protocols (Extended Triple Diffie-Hellman (X3DH); elliptic curve Diffie-Hellman (ECDH)) to ensure mutual authentication of the mobile device 130, the server apparatus 135, and the computing device 105. The DH protocol provides strong security properties, such as, without limitation, forward secrecy and time-based expiration. Because DH protocol is asynchronous, keys are calculated by the computing device 105 and the server apparatus 135 without sending those keys over the network 140. Also, a VPN password does not need to be sent over the network 140. A password can be used to unlock the computing device 105 and to protect elliptic curve cryptography (ECC) public/private keys if used. But the use of DH protocols does not require the user to use passwords to authenticate the user to a network server, website, or the like. Thus, virtually anywhere a password is used, the procedures described herein may be used.

Figure 2:
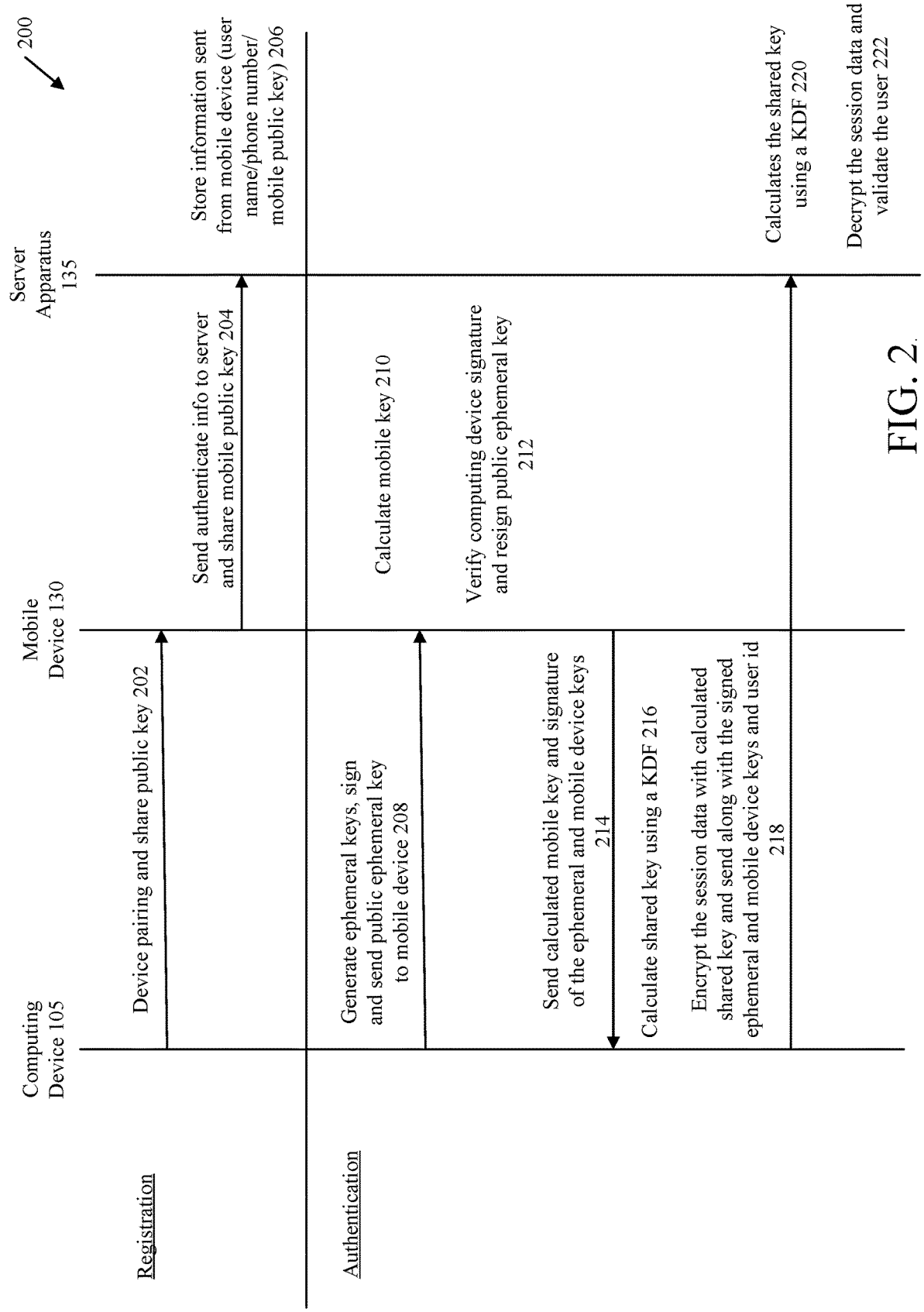
FIG. 2 is a schematic flow diagram illustrating one embodiment of operations performed by the components shown in FIG. 1.
Figure 3:
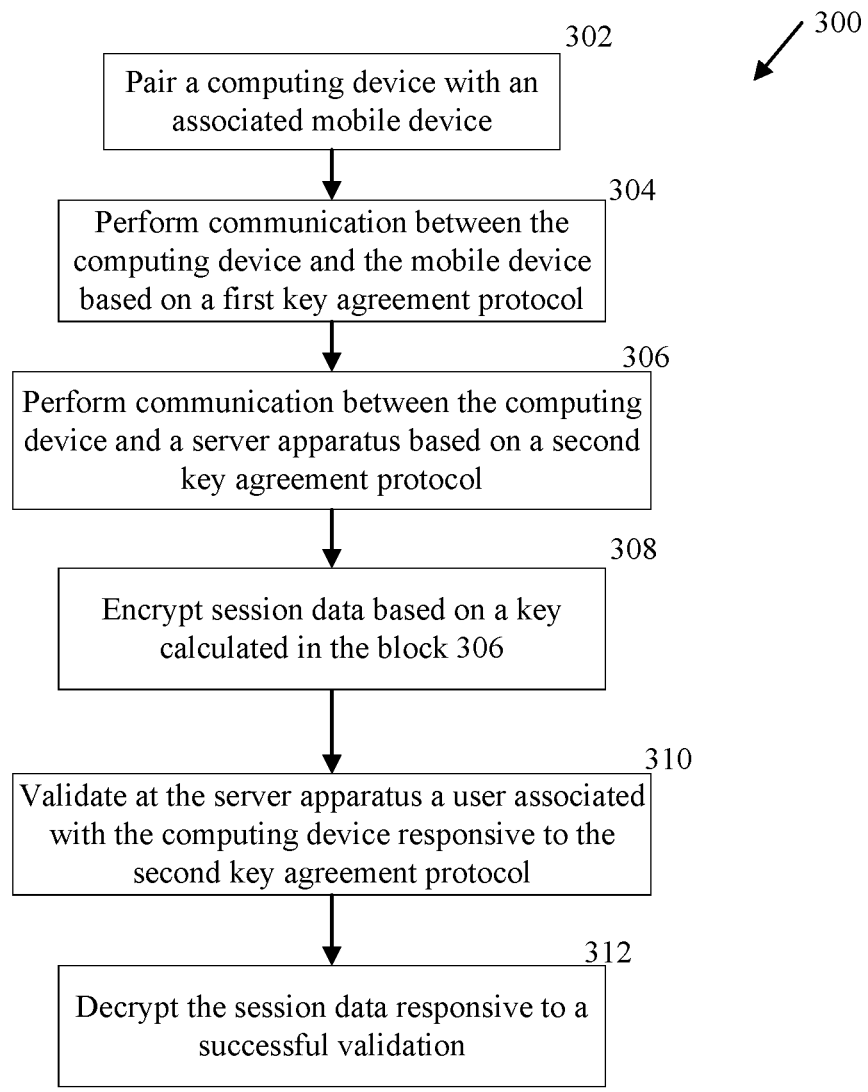
FIG. 3 is a schematic flow chart of an exemplary process performed by a server apparatus.

In some embodiments, the components of the system 100 may perform the operations described in FIG. 2. Before authentication begins the system 100 performs registration. During registration, at a step 202, the computing device 105 and the associated mobile device 130 are paired, then the computing device 105 shares its public key with the mobile device 130. At a step 204, the mobile device 130 sends/shares its public key and some registration data to the server apparatus 135. The registration data may include user information and phone number associated with the mobile device 130. At a step 206, the server apparatus 135 stores the received registration data and the public key of the mobile device 130. Steps 202 and 204 may be switched in order.

After registration, authentication begins. At a first step 208, the computing device 105 generates an ephemeral public/private key pair, then signs and sends the ephemeral public key to the mobile device 208. At a step 210, the mobile device 130 calculates the mobile key. In one embodiment, the mobile key is calculated using cryptographic hash (key derivation function (KDF)) of (elliptic curve Diffie-Hellman (ECDH) (the private key of the mobile device 130, the public key of the server apparatus 135), and time (msec/time period)). At a step 212, the mobile device 130 verifies the signature from the computing device 105 and resigns the public ephemeral key. At a step 214, the mobile device 130 sends the calculated mobile key and signatures of the ephemeral key and the computing device public key to the computing device 105. At a step 216, the computing device 105 calculates a shared key using KDF (ECDH (the private key of the computing device 105, the public key of server apparatus 135) || ECDH (the private ephemeral key, the public key of server apparatus 135) || the mobile key). At a step 218, the computing device 105 encrypts current session data with the calculated shared key and sends the encrypted session data to the server apparatus 135 with the signed ephemeral and mobile device public keys. The computing device 105 may also send user identification (id) information. At a step 220, the server apparatus 135 calculates the shared key using as KDF (ECDH (the public key of the computing device 105, the private key of the server apparatus 135) || ECDH (the public ephemeral key, the private key of the server apparatus 135) || cryptographic hash of (ECDH (the public key of the mobile device 130, the private key of the server apparatus 135), time in msec/time period)). At a step 222, the server apparatus 135 decrypts the session data and validates the user associated with the computing device 105 and the mobile device 130.

In some embodiments, various forward secrecy options/techniques may be used. The forward secrecy options/techniques may include a double ratchet algorithm used in combination with a hashing cryptographic ratchet. The Double Ratchet algorithm is used by two parties to exchange encrypted messages based on a shared secret key. Typically, the parties will use some key agreement protocol, such as, without limitation, X3DH, ECDH, to agree on the shared secret key. Following this, the parties use the Double Ratchet algorithm to send and receive encrypted messages.

The parties derive new keys for every Double Ratchet message so that earlier keys cannot be calculated from later ones. The parties also send DH public values attached to their messages. The results of DH calculations are mixed into the derived keys so that later keys cannot be calculated from earlier ones. These properties give some protection to earlier or later encrypted messages in case of a compromise of a party's keys. KDF, Double Ratchet algorithms, X3DH, ECDH, and other key agreement protocols are extremely well known in the art and no further explanation is necessary for a person of ordinary skill in the art to understand disclosed subject matter.

A KDF chain is a core concept in the Double Ratchet algorithm. KDF is a cryptographic function that takes a secret and random KDF key and some input data and returns output data. The output data is indistinguishable from random provided the key isn't known (i.e. a KDF satisfies the requirements of a cryptographic). If the key is not secret and random, the KDF should still provide a secure cryptographic hash of its key and input data.

In some embodiments, a generated X3DH key can be used as a secret or time-based one-time password (TOTP) token that can be entered by the user if web interface is being accessed. Proposed schema allow automatic authentication without the user entering the token or a password, or performing another user action.

With reference to FIG. 2, FIG. 2 is a block diagram of a process 200 performed between a computing device, an associated mobile device, and a server apparatus to establish a connection between the computing device and the server apparatus. At a block 302, a computing device is paired with an associated mobile device. At a block 304, communication is performed between the computing device and the mobile device based on a first key agreement protocol. At a block 306, communication is performed between the computing device and a server apparatus based on a second key agreement protocol. At a block 308, session data is encrypted based on a key calculated at the computing device. At a block 310, the server apparatus validates a user associated with the computing device responsive to the second key agreement protocol. At a block 312, the session data is decrypted responsive to a successful validation.

In other embodiments, schema is proposed for allowing continuous authentication with the NFC presence of the mobile device. The computing device can regularly reinitiate the session with the server apparatus using the schema described above relying on the mobile device being nearby, within signal range.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a network interface; and
   a memory that stores code executable by the processor, the code comprising:
      code that receives signed keys from a computing device over a network via the network interface, wherein the signed keys include a key signed by a mobile device associated with the computing device and wherein the signed keys were generated responsive to a first key agreement protocol configured to provide one of forward secrecy protection, post-compromise protection, and reply attack protection in the form of time-based expiration;
      code that authenticates the received signed keys responsive to prior knowledge of public keys associated with at least one of the computing device and the mobile device according to a second key agreement protocol configured to provide one of forward secrecy protection, post-compromise protection, and reply attack protection in the form of time-based expiration; and
      code that initiates a communication between the processor and the computing device responsive to the received signed keys being authenticated.

2. The apparatus of claim 1, wherein the code further comprising:
   code that receives encrypted session data; and
   code that decrypts the encrypted session data,
   wherein the session data was signed based on the second key agreement protocol.

3. The apparatus of claim 1, wherein the first key agreement protocol is configured to provide forward secrecy protection and time-based expiration, and the second key agreement protocol configured to provide one of forward secrecy protection and time-based expiration.

4. The apparatus of claim 1, wherein the first and second key agreement protocols include extended triple Diffie-Hellman protocol.

5. The apparatus of claim 1, wherein the first and second key agreement protocols include elliptical curve Diffie-Hellman protocol.

6. The apparatus of claim 1, wherein the first and second key agreement protocols include hashing cryptographic ratcheting.

7. The apparatus of claim 5, wherein the hashing cryptographic ratcheting includes double ratcheting.

8. The apparatus of claim 1, wherein the initiated communication includes communication over a virtual private network (VPN).

9. A method comprising:
   at a server apparatus,
   receiving signed keys from a computing device over a network via the network interface, wherein the signed keys include a key signed by a mobile device associated with the computing device and wherein the signed keys were generated responsive to a first key agreement protocol configured to provide one of forward secrecy protection, post-compromise protection, and reply attack protection in the form of time-based expiration;
   authenticating the received signed keys responsive to prior knowledge of public keys associated with at least one of the computing device and the mobile device according to a second key agreement protocol configured to provide one of forward secrecy protection, post-compromise protection, and reply attack protection in the form of time-based expiration; and
   initiating a communication between the processor and the computing device responsive to the received signed keys being authenticated.

10. The method of claim 9, further comprising:
    at the server apparatus,
    receiving encrypted session data; and
    decrypting the encrypted session data,
    wherein the session data was signed based on the second key agreement protocol.

11. The method of claim 9, wherein the first key agreement protocol is configured to provide forward secrecy protection and time-based expiration, and the second key agreement protocol configured to provide one of forward secrecy protection and time-based expiration.

12. The method of claim 9, wherein the first and second key agreement protocols include extended triple Diffie-Hellman protocol.

13. The method of claim 9, wherein the first and second key agreement protocols include elliptical curve Diffie-Hellman protocol.

14. The method of claim 9, wherein the first and second key agreement protocols include hashing cryptographic ratcheting.

15. The method of claim 9, wherein the hashing cryptographic ratcheting includes double ratcheting.

16. The method of claim 9, wherein the initiating a communication includes initiating communication over a virtual private network (VPN).

17. A program product comprising a non-transitory computer readable storage medium that stores code executable by a processor, the executable code comprising code to perform:
    receiving signed keys from a computing device over a network via the network interface, wherein the signed keys include a key signed by a mobile device associated with the computing device and wherein the signed keys were generated responsive to a first key agreement protocol configured to provide one of forward secrecy protection, post-compromise protection, and reply attack protection in the form of time-based expiration;
    authenticating the received signed keys responsive to prior knowledge of public keys associated with at least one of the computing device and the mobile device according to a second key agreement protocol configured to provide one of forward secrecy protection, post-compromise protection, and reply attack protection in the form of time-based expiration; and
    initiating a communication between the processor and the computing device responsive to the received signed keys being authenticated.

18. The program product of claim 17, the code to further perform:

receiving encrypted session data; and decrypting the encrypted session data, wherein the session data was signed based on the second key agreement protocol.

19. The program product of claim 17, wherein the first and second key agreement protocols include one of extended triple Diffie-Hellman protocol or elliptical curve Diffie-Hellman protocol with a double ratcheting algorithm.

20. The program product of claim 17, wherein the initiating a communication includes initiating communication over a virtual private network (VPN).

* * * * *